UNITED STATES PATENT OFFICE.

ROBERT BRANNAN, OF BALTIMORE, MARYLAND.

IMPROVEMENT IN COMPOSITIONS FOR PAINTS.

Specification forming part of Letters Patent No. 4,958, dated February 5, 1847.

*To all whom it may concern:*

Be it known that I, ROBERT BRANNAN, of the city and county of Baltimore, and State of Maryland, have discovered a new and useful composition for adding to paints to render them more durable, beautiful, and cheap, which is described as follows:

To make a gallon and a fourth of paint of a permanent and durable body, take one gallon of rain-water, three pounds of gum-shellac, three ounces of pearl-ash, and put these into an iron vessel and boil them slowly over a moderate fire without stirring until the ingredients are well incorporated. This composition will then be in a fit state for the addition of all kinds of paints which are ground in linseed-oil or in a dry state, and, when properly mixed and put upon wood, iron, or other materials, will produce a beautiful and durable coat, that will become hard and dry in about half the length of time required for the drying of common oil-paints, and reduces the expense in oil about one-half by dispensing with the use of a portion of the oil, and makes a more durable paint, possessing a finer polish than has ever been produced in the ordinary mode of preparing paint.

What I claim as my discovery, and desire to secure by Letters Patent, is—

The before-described composition to be added to paints ground in oil or otherwise for producing the effects above described.

ROBERT BRANNAN.

Witnesses:
WM. P. ELLIOT,
A. E. H. JOHNSON.